US012494098B2

(12) United States Patent
Shen

(10) Patent No.: US 12,494,098 B2
(45) Date of Patent: Dec. 9, 2025

(54) DOOR ACCESS CONTROL METHOD CAPABLE OF SENDING EMERGENCY REPORT

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 18/327,257

(22) Filed: Jun. 1, 2023

(65) Prior Publication Data

US 2024/0371219 A1 Nov. 7, 2024

(30) Foreign Application Priority Data

May 4, 2023 (TW) ................................ 112116643

(51) Int. Cl.
*G07C 9/00* (2020.01)

(52) U.S. Cl.
CPC ..... *G07C 9/00309* (2013.01); *G07C 2209/02* (2013.01); *G07C 2209/08* (2013.01)

(58) Field of Classification Search
None
See application file for complete search history.

(56) References Cited

U.S. PATENT DOCUMENTS 3,569,632 A * 3/1971 Beresin .................. H04B 1/745 370/509
4,348,835 A 9/1982 Jones et al.
4,867,496 A 9/1989 Thomas
5,782,509 A 7/1998 Uyeda
6,177,771 B1 1/2001 Kinzer et al.
6,454,324 B1 9/2002 Lewis et al.
6,634,140 B1 10/2003 Sellman
6,745,603 B1 6/2004 Shaw
6,786,006 B2 9/2004 Kowalczyk et al.
6,891,479 B1 5/2005 Eccleston
7,051,403 B2 5/2006 Homberg
7,061,197 B1 6/2006 Mullet et al.
7,068,179 B2 6/2006 Snell et al.
7,143,547 B2 12/2006 Liles, Jr.
(Continued)

FOREIGN PATENT DOCUMENTS

AU 2014339759 B2 5/2018
EP 1788169 A1 5/2007
(Continued)

*Primary Examiner* — Carlos Garcia
(74) *Attorney, Agent, or Firm* — Che-Yang Chen; Law Office of Michael Chen

(57) ABSTRACT

A door access control method includes obtaining the management authority of at least one lock and dividing the users of the lock into normal users and concerned users. A normal user of a lock can only execute a normal unlocking procedure to unlock the lock, and the lock automatically switches back to the locking state after the lock has been unlocked for a preset period of time. Aside from the normal unlocking procedure, a concerned user is permitted to execute an emergency report and unlocking procedure in which the lock remains in the unlocking state even though the unlocking time expires, and a manager or a report receiver is informed of execution of the emergency report and unlocking procedure. In this case, any person can open the lock, and the manager or the report receiver can know the situation of the concerned user at the first moment.

9 Claims, 2 Drawing Sheets

(56) References Cited

U.S. PATENT DOCUMENTS

| | | | |
|---|---|---|---|
| 7,234,201 | B2 | 6/2007 | Brown et al. |
| 7,282,883 | B2 | 10/2007 | Mullet et al. |
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,248,005 | B2 | 8/2012 | Romer |
| 8,359,790 | B2 | 1/2013 | Shin |
| 8,382,008 | B1 | 2/2013 | Ricciardi et al. |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,547,046 | B2 | 10/2013 | Burris et al. |
| 8,601,744 | B2 | 12/2013 | Wildforster et al. |
| 8,654,650 | B1 * | 2/2014 | Vermeulen .......... G06F 16/2343 707/704 |
| 8,695,277 | B2 | 4/2014 | Romer et al. |
| 8,768,565 | B2 * | 7/2014 | Jefferies ............... G07C 5/0808 701/32.7 |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,032,498 | B1 * | 5/2015 | Ben Ayed ............... G06F 21/35 726/9 |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,830,932 | B1 | 11/2017 | Gunderson et al. |
| 9,869,117 | B2 | 1/2018 | Houser et al. |
| 9,886,831 | B1 | 2/2018 | Svoboda et al. |
| 9,911,255 | B2 * | 3/2018 | Lee .......................... G07C 9/27 |
| 9,947,153 | B2 * | 4/2018 | Bergerhoff ............ H04L 9/0869 |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,273,736 | B2 | 4/2019 | Hucker |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,316,568 | B2 | 6/2019 | Langenberg et al. |
| 10,344,502 | B2 | 7/2019 | McKibben et al. |
| 10,415,301 | B2 | 9/2019 | Kuan |
| 10,458,151 | B1 | 10/2019 | Shen |
| 10,472,873 | B2 | 11/2019 | Ladha et al. |
| 10,553,056 | B2 * | 2/2020 | Shirai ................ G07C 9/00309 |
| 10,559,151 | B2 | 2/2020 | Kvinge et al. |
| 10,616,710 | B2 * | 4/2020 | Stitt ...................... H04W 76/15 |
| 10,648,208 | B2 | 5/2020 | Eickhoff |
| 10,704,310 | B1 | 7/2020 | Barbon et al. |
| 10,704,313 | B2 | 7/2020 | Houser et al. |
| 10,724,288 | B2 | 7/2020 | Baumgarte |
| 10,844,644 | B2 | 11/2020 | Langenberg et al. |
| 10,968,677 | B2 | 4/2021 | Hass |
| 11,124,997 | B2 | 9/2021 | Eickhoff |
| 11,250,655 | B2 | 2/2022 | Shen |
| 11,321,794 | B2 * | 5/2022 | Kobayashi ............. G06Q 10/08 |
| 11,542,727 | B2 | 1/2023 | Hsu |
| 11,544,979 | B1 | 1/2023 | Shen |
| 11,551,495 | B2 * | 1/2023 | Kano ................. G07C 9/00571 |
| 11,798,330 | B2 * | 10/2023 | Shen .................. G07C 9/00817 |
| 11,995,932 | B2 * | 5/2024 | Park ................... G07C 9/00571 |
| 12,223,382 | B2 * | 2/2025 | Von Kaldenberg .......................... G06K 19/07773 |
| 2002/0180582 | A1 * | 12/2002 | Nielsen .................... G07C 9/21 340/5.6 |
| 2003/0127869 | A1 | 7/2003 | Herron et al. |
| 2005/0154612 | A1 | 7/2005 | Smith et al. |
| 2006/0244271 | A1 | 11/2006 | Hass |
| 2007/0256362 | A1 | 11/2007 | Hansen |
| 2010/0107495 | A1 | 5/2010 | Bourgeois et al. |
| 2010/0315229 | A1 | 12/2010 | Shin |
| 2012/0095926 | A1 * | 4/2012 | Nishimura ............. G06Q 10/06 705/301 |
| 2012/0190325 | A1 | 7/2012 | Abu-Hakima et al. |
| 2013/0009785 | A1 | 1/2013 | Finn et al. |
| 2013/0216438 | A1 | 8/2013 | Hill et al. |
| 2013/0346333 | A1 | 12/2013 | Hassler et al. |
| 2014/0018049 | A1 * | 1/2014 | Cannon ................... H04W 4/16 455/414.1 |
| 2014/0051407 | A1 * | 2/2014 | Ahearn ............. G07C 9/00174 455/414.1 |
| 2014/0143421 | A1 * | 5/2014 | Fu ........................... H04W 4/20 709/225 |
| 2014/0255252 | A1 | 9/2014 | Stratman et al. |
| 2014/0266793 | A1 * | 9/2014 | Velado .................... B63B 79/10 340/870.16 |
| 2014/0282934 | A1 | 9/2014 | Miasnik et al. |
| 2015/0070166 | A1 | 3/2015 | Boyden et al. |
| 2015/0079965 | A1 * | 3/2015 | Mullins ................... H04W 8/20 455/419 |
| 2015/0194033 | A1 | 7/2015 | Esposito et al. |
| 2015/0195705 | A1 * | 7/2015 | Mullins ................. H04W 12/08 455/419 |
| 2015/0339913 | A1 | 11/2015 | Lyman et al. |
| 2016/0220716 | A1 | 8/2016 | Childress et al. |
| 2016/0348415 | A1 | 12/2016 | Baumgarte |
| 2017/0275912 | A1 | 9/2017 | Murphy |
| 2017/0275921 | A1 | 9/2017 | Murphy et al. |
| 2017/0328100 | A1 | 11/2017 | Eickhoff |
| 2017/0332055 | A1 * | 11/2017 | Henderson ......... G07C 9/00174 |
| 2018/0268633 | A1 * | 9/2018 | Kwon ................ G07C 9/00857 |
| 2018/0334841 | A1 | 11/2018 | Langenberg et al. |
| 2019/0043296 | A1 | 2/2019 | Baumgarte et al. |
| 2019/0145138 | A1 | 5/2019 | Eickhoff |
| 2019/0153764 | A1 | 5/2019 | Baumgarte |
| 2019/0203503 | A1 | 7/2019 | Chang |
| 2019/0264486 | A1 | 8/2019 | Toloday et al. |
| 2019/0319557 | A1 | 10/2019 | Dye et al. |
| 2019/0338576 | A1 | 11/2019 | Wang |
| 2019/0345738 | A1 | 11/2019 | McKibben et al. |
| 2019/0376316 | A1 | 12/2019 | Hsu |
| 2019/0376317 | A1 | 12/2019 | Hsu |
| 2019/0383080 | A1 | 12/2019 | Barbon et al. |
| 2020/0037142 | A1 | 1/2020 | Lofton |
| 2020/0190885 | A1 | 6/2020 | Coleman |
| 2020/0256108 | A1 | 8/2020 | Shetty et al. |
| 2020/0327758 | A1 | 10/2020 | Ma et al. |
| 2020/0372743 | A1 | 11/2020 | Miller et al. |
| 2021/0011443 | A1 | 1/2021 | McNamara et al. |
| 2021/0012598 | A1 | 1/2021 | Giebat et al. |
| 2021/0023248 | A1 | 1/2021 | Townsend et al. |
| 2021/0056791 | A1 | 2/2021 | Shen |
| 2021/0123287 | A1 | 4/2021 | Miller et al. |
| 2021/0252179 | A1 | 8/2021 | Grinstead et al. |
| 2021/0308311 | A1 | 10/2021 | Stewart et al. |

(56) References Cited

U.S. PATENT DOCUMENTS

| | | | | |
|---|---|---|---|---|
| 2022/0148393 | A1 | 5/2022 | Shen et al. | |
| 2022/0307316 | A1 | 9/2022 | Soderqvist | |
| 2023/0186412 | A1* | 6/2023 | Farrar | G06Q 50/12 709/225 |
| 2024/0371219 | A1* | 11/2024 | Shen | G07C 9/00309 |
| 2024/0386763 | A1* | 11/2024 | Shen | G07C 9/00182 |

FOREIGN PATENT DOCUMENTS

| | | | |
|---|---|---|---|
| EP | 3550528 | A1 | 9/2019 |
| EP | 3805490 | A1 | 4/2021 |
| GB | 2572027 | A | 9/2019 |
| KR | 20210019168 | A | 2/2021 |
| KR | 20210033154 | A | 3/2021 |
| WO | 8800633 | A1 | 1/1988 |
| WO | 2021007588 | A1 | 1/2021 |
| WO | 2021050616 | A1 | 3/2021 |
| WO | 2021214134 | A1 | 10/2021 |

* cited by examiner

DOOR ACCESS CONTROL METHOD CAPABLE OF SENDING EMERGENCY REPORT

BACKGROUND OF THE INVENTION

The present invention relates to a door access control method and, more particularly, to a door access control method which permits a concerned person to remain a lock in an unlocking state through execution of an emergency report and unlocking procedure until a door on which the lock is installed is opened, and the lock can then restore the unlocking state. Furthermore, while the lock remains in the unlocking state, the concerned person needs to send a message regarding execution of the emergency report and unlocking procedure to a manager or a report receiver.

In an aging society, it is a common problem that a solitary is injured or dies but on one finds out. Even if a person is aware of an uncommon event, such as a solitary neighbor has not gone out for several days, the person is possibly blocked by the locked door and, thus, cannot enter the solitary neighbor's house to provide assistance. For example, a solitary elder who moves with difficulty suddenly feels discomfort or falls at home, the solitary elder is not able to get up and go near the lock to unlock the door before calling out for help. If the solitary elder calls a relative, a friend or an ambulance, the called person cannot access the locked door, and the golden time may be wasted when breaking down the door is required.

BRIEF SUMMARY OF THE INVENTION

In an aspect, the present invention provides a door access control method capable of sending an emergency report. The door access control method comprises:

- installing a lock APP on a first smart mobile device of a manager;
- installing the lock APP on a second smart mobile device of a concerned user, with the concerned user using the second smart mobile device to set a first preset unlocking information;
- using the lock APP installed on the first smart mobile device to match with a lock within a communication range of the first smart mobile device to thereby obtain management authority of the lock;
- using the first smart mobile device to authorize authority of execution of an emergency report and unlocking procedure on the lock to the second smart mobile device;
- wherein when the concerned user executes the emergency report and unlocking procedure via an interface of the lock APP installed on the second smart mobile device, the lock APP installed on the second smart mobile device is used to input a real-time unlocking information, wherein when the real-time unlocking information does not match with the first preset unlocking information, the lock remains in a locking state, wherein when the real-time unlocking information matches with the first preset unlocking information, the second smart mobile device executes a reporting procedure to report to the manager, the lock is switched to an unlocking state and remains in the unlocking state, and wherein the lock restores the locking state after the lock is opened.

When a concerned user needs help, the emergency report and unlocking procedure can be executed to keep the lock at the location of the concerned user in the unlocking state, and the lock will not restore the locking state unless the lock is opened. Thus, any person can open the lock to check the situation of the concerned user. When the concerned user executes the emergency report and unlocking procedure, the manager or a preset report receiver will receive the report. Thus, the situation of the concerned user requiring help can be reported at the first moment.

In an example, the concerned user uses the second smart mobile device to register a username. The manager uses the username to authorize the authority of execution of the emergency report and unlocking procedure to the second smart mobile device. When the concerned user uses the interface of the lock APP installed on the second smart mobile device to execute a normal unlocking procedure, a real-time unlocking information is inputted into the second smart mobile device. The lock remains in the locking state when the real-time unlocking information does not match with the first preset unlocking information. The lock switches to the unlocking state when the real-time unlocking information matches with the first preset unlocking information. A countdown of an unlocking time of the lock is executed after the lock switches to the unlocking state. The lock switches back to the locking state after the countdown is over or the lock is opened.

The concerned user is permitted to unlock the lock through the normal unlocking procedure, such that the concerned user can normally access the house or the room without interrupting the manager or the report receiver.

In an example, the interface of the lock APP installed on the first smart mobile device guides setting of a second preset unlocking information. When the manager uses the interface of the lock APP installed on the first smart mobile device to execute a normal unlocking procedure, a real-time unlocking information is inputted into the second smart mobile device. The lock remains in the locking state when the real-time unlocking information inputted into the first smart mobile device does not match with the second preset unlocking information. The lock switches to the unlocking state when the real-time unlocking information inputted into the first smart mobile device matches with the second preset unlocking information. A countdown of an unlocking time of the lock is executed after the lock switches to the unlocking state. The lock switches back to the locking state after the countdown is over or the lock is opened.

In an example, the door access control method further comprises:

- installing the lock APP on a third smart mobile device of a normal user, registering a username of the normal user, and setting a third preset unlocking information; and
- using the first smart mobile device and the username of the normal user to authorize the authority of execution of a normal unlocking procedure of the lock to the third smart mobile device,
- wherein when the normal user uses an interface of the lock APP installed on the third smart mobile device to execute the normal unlocking procedure, the third smart mobile device is used to input a real-time unlocking information,
- wherein the lock remains in the locking state when the real-time unlocking information inputted into the third smart mobile device does not match with the third preset unlocking information, wherein the lock switches to the unlocking state when the real-time unlocking information matches inputted into the third smart mobile device with the third preset unlocking information, wherein a countdown of an unlocking time of the lock is executed after the lock switches back to the unlocking state, and wherein the lock switches to the locking state after the countdown is over or the lock is opened.

The manager can selectively authorize a normal user and/or a concerned user, such that the normal user can only execute the normal unlocking procedure, whereas the concerned user can execute the normal unlocking procedure and the emergency report and unlocking procedure. Thus, it is more convenient for the manager to manage a plurality of locks and associated persons.

In an example, when the report receiver does not respond to the report, the report is repeatedly sent to the report receiver. The reporting procedure is terminated when the report receiver responds to the report.

In an example, when the lock APP installed on the second smart mobile device executes the reporting procedure, the interface of the lock APP installed on the first smart mobile device shows a message associated with the report. The report receiver uses the interface of the lock APP installed on the first smart mobile device to respond to the report and to terminate the reporting procedure.

In another aspect, a door access control method capable of sending an emergency report comprises:

installing a lock APP on a first smart mobile device of a concerned user and setting a first preset unlocking information and a report receiver;

using the lock APP installed on the first smart mobile device to match with a lock within a communication range of the first smart mobile device to thereby obtain management authority of the lock, permitting the first smart mobile device to execute an emergency report and unlocking procedure on the lock;

wherein when the concerned user executes the emergency report and unlocking procedure via an interface of the lock APP installed on the first smart mobile device, the lock APP installed on the first smart mobile device is used to input a real-time unlocking information, wherein when the real-time unlocking information does not match with the first preset unlocking information, the lock remains in a locking state, wherein when the real-time unlocking information matches with the first preset unlocking information, the first smart mobile device executes a reporting procedure to report to the report receiver, the lock is switched to an unlocking state and remains in the unlocking state, and wherein the lock restores the locking state after the lock is opened.

When a concerned user needs help, the emergency report and unlocking procedure can be executed to keep the lock at the location of the concerned user in the unlocking state, and the lock will not restore the locking state unless the lock is opened. Thus, any person can open the lock to check the situation of the concerned user. When the concerned user executes the emergency report and unlocking procedure, the lock (such as a door lock) can remain in the unlocking state without movement of the concerned user who is not feeling well or is unable to move smoothly, providing excellent convenience. Furthermore, when the concerned user executes the emergency report and unlocking procedure, the manager or a preset report receiver will receive the report. Thus, the situation of the concerned user requiring help can be reported at the first moment.

In an example, when the concerned user uses the interface of the lock APP installed on the first smart mobile device to execute a normal unlocking procedure, a real-time unlocking information is inputted into the first smart mobile device. The lock remains in the locking state when the real-time unlocking information does not match with the first preset unlocking information. The lock switches to the unlocking state when the real-time unlocking information matches with the first preset unlocking information. A countdown of an unlocking time of the lock is executed after the lock switches to the unlocking state. The lock switches back to the locking state after the countdown is over or the lock is opened.

The concerned user is permitted to unlock the lock through the normal unlocking procedure, such that the concerned user can normally access the house or the room without interrupting the manager or the report receiver.

In an example, when the report receiver does not respond to the report, the report is repeatedly sent to the report receiver. The reporting procedure is terminated when the report receiver responds to the report.

In an example, the lock APP is installed on a second smart mobile device held by the report receiver. When the concerned user executes the reporting procedure, a message of the report is displayed on an interface of the lock APP installed on the second smart mobile device. The report receiver responds to the report via the interface of the lock APP installed on the second smart mobile device to terminate the reporting procedure.

In an example, the report receiver uses the lock APP installed on the second smart mobile device to register a username. The concerned user uses the username to set the report receiver and sending information of the setting of the report receiver to the lock APP installed on the second smart mobile device. The setting of the report receiver is successfully set only when the report receiver uses the lock APP installed on the second smart mobile device to accept the setting of the report receiver.

The present invention will become clearer in light of the following detailed description of illustrative embodiments of this invention described in connection with the drawings.

DETAILED DESCRIPTION OF THE INVENTION

Figure 1:
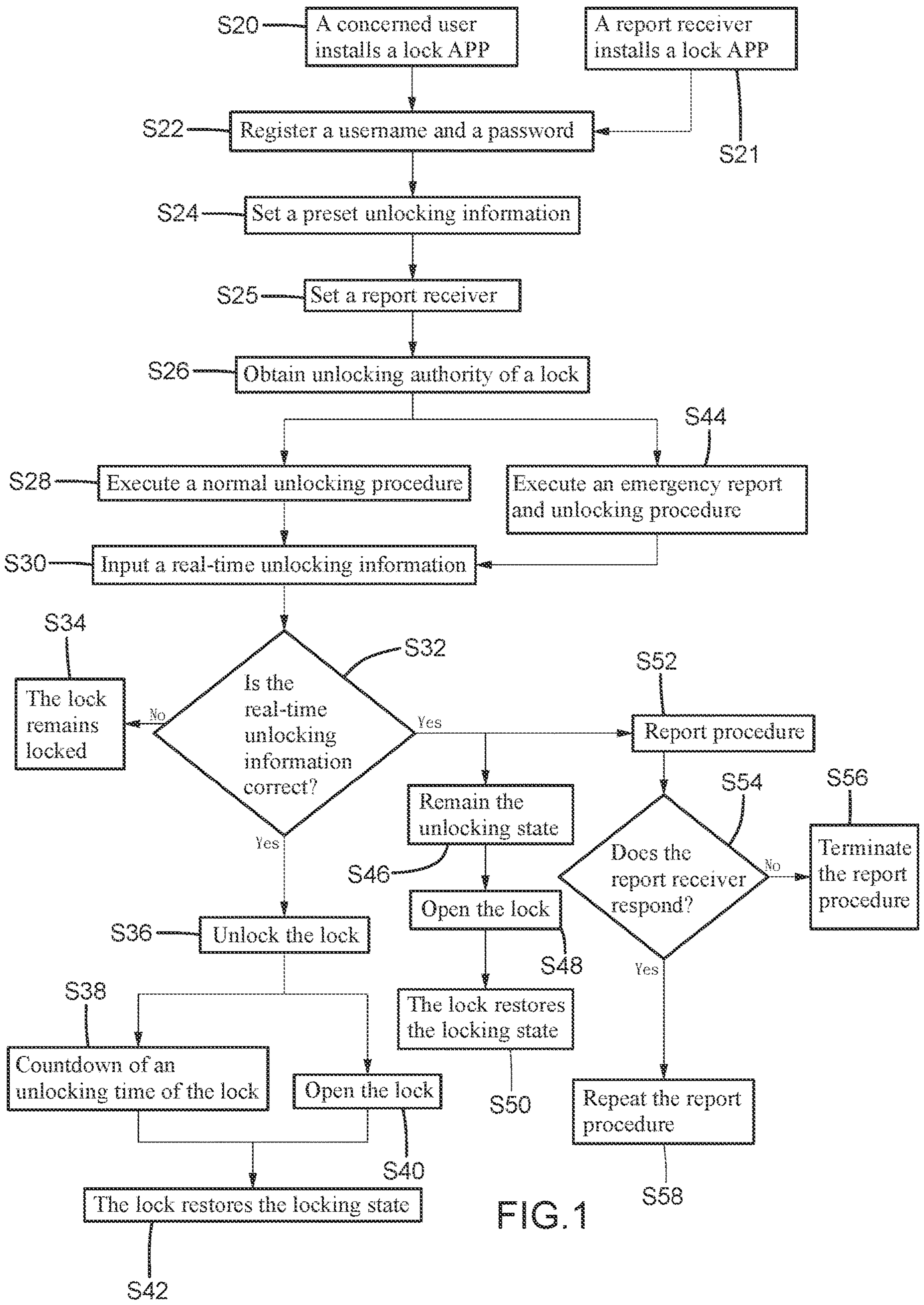
FIG. 1 is a schematic flowchart illustrating a door access control method capable of sending an emergency report of a first embodiment according to the present invention.

The present invention relates to a door access system for a solitary (hereinafter referred to as "concerned user") who is not feeling well, in a poor health condition, and/or old. With reference to FIG. 1 showing a door access control method capable of sending an emergency report of a first embodiment according to the present invention, the door access system generally requires cooperation of some hardware equipment including but limited to at least one lock, a smart mobile device (such as a smartphone) held by the concerned user, and a smart mobile device (such as a smartphone) held by a report receiver. The lock is set to a normally locking state. For example, in a case that the lock is a door lock mounted on a door and set to a normally locking state, when the locking state is not released, the closed door cannot be opened by operating the door lock from the outer side.

A lock application (APP) is installed on the smart mobile device of the concerned user (step S20), and the lock APP is also installed on the smart mobile device of the report receiver (step S21). Specifically, since using the smart mobile device of the concerned user to obtain the management authority of the lock requires execution of the lock APP, the lock APP must be installed on the smart mobile device of the concerned user beforehand. Preferably, the lock APP is also installed on the smart mobile device of the report receiver predetermined to receive the report from the concerned user, which can be used to proceed with the reporting procedure (step S52).

In an embodiment, when the lock APP is installed on either of the smart mobile device of the concerned user and the smart mobile device of the concerned user for the first time, an interface of the lock APP will guide the concerned user and/or the report receiver to register a username and a password (step S22). The username may be characters, numbers, symbols, or a combination thereof set by himself or herself. The password may be characters, numbers, symbols, or a combination thereof set by himself or herself. Alternatively, the password may be a biological feature of the holder of the smart mobile device. For example, the password set by the lock APP installed on the smart mobile device of the concerned user is the biological feature, such as the fingerprint feature, the facial feature, the iris feature, etc., of the concerned user.

After the concerned user has registered the username and the password on his or her smart mobile device, the lock APP installed on the smart mobile device of the concerned user guides the concerned user to input an unlocking information as a preset unlocking information (step S24). Specifically, the preset unlocking information may be characters, numbers, symbols, or a combination thereof. Alternatively, the unlocking information may be a biological feature, such as the fingerprint feature, the facial feature, the iris feature, etc. It is noted that after the smart mobile device of the report receiver has finished registration of the username and the password, the procedure of setting the preset unlocking information can be skipped, because there is no need to use the smart mobile device of the report receiver to unlock the lock.

After the smart mobile device of the concerned user has finished the procedure of setting the preset unlocking information, the lock APP further guides the concerned user to set a report receiver (step S25). Specifically, the report receiver may be, but not limited to, a friend, a relative, a landlord, a social worker, etc. trusted by the concerned user. In a non-restrictive example, the lock APP may be installed on the smart mobile device of the report receiver. Thus, given that the concerned user knows the username of the report receiver, the username of the report receiver can be inputted through the interface of the lock APP installed on the smart mobile device of the concerned user to thereby connect with the lock APP installed on the smart mobile device of the report receiver via Wi-Fi, Global System for Mobile Communication, or Bluetooth. After the report receiver presses an “agree” icon or “accept” icon on the interface of the lock APP installed on the smart mobile device of the report receiver, the lock APP installed on the smart mobile device of the concerned user completes setting of the report receiver.

More specifically, after the lock APP is installed on the smart mobile device of the report receiver, when the concerned user inputs a username associated with the report receiver, the smart mobile device of the concerned user can be connected with the smart mobile device of a user associated with the inputted username via a wireless network, such as Wi-Fi, Global System for Mobile Communication, or Bluetooth, and the interface of the lock APP installed on the smart mobile device of the user associated with the username guides the user to choose whether to accept the invitation of becoming a report receiver of the concerned user. The user becomes the report receiver of the concerned user only when the user agrees.

It is worth mentioning that setting of the report receiver can be achieved by an approach other than the lock APP installed on the smart mobile device to receive the information associated with the concerned user. For example, the report receiver may be a social worker, and the report receiver setting procedure may be achieved by the concerned user inputting the mobile phone number of the social worker. In this case, the report receiver set by the concerned user cannot deny.

After the smart mobile device of the concerned user finishes setting of the report receiver, the lock APP is connected with a lock within the communication range of the smart mobile device of the concerned user and obtains the management authority of the lock after matching (step S26).

Specifically, the lock may include, but not limited to, two matching buttons, and the lock may be paired with a card which carries a specific serial number. When the lock APP installed on the smart mobile device of the concerned user is matching with the lock, the interface of the lock APP requests adding of a lock to be managed, and the two matching buttons of the lock are pressed for a longer time (such as 5 seconds), permitting the smart mobile device of the concerned user to search the lock. When the smart mobile device of the concerned user finds the lock, the lock APP guides the concerned user to input the serial number on the card. The smart mobile device of the concerned user can obtain the management authority of the lock only when the inputted serial number is correct. Thus, the smart mobile device of the concerned user obtains the authority of execution of an emergency report and unlocking procedure and a normal unlocking procedure.

For example, in a case that the smart mobile device of the concerned user obtains a hardware identification serial number of the lock, in subsequent communication between the smart mobile device of the concerned user and the lock, the lock may compare the hardware identification serial number transmitted by the smart mobile device of the concerned user with its own hardware identification serial number to identify whether the smart phone device connected with the lock has the management authority.

When the lock APP installed on the smart mobile device of the concerned user executes a normal unlocking procedure (step S28), a real-time unlocking information is inputted into the smart mobile device of the concerned user (step S30). The lock remains in the locking state (step S34) when the real-time unlocking information is determined to be incorrect at step S32. The lock is unlocked (step S36) when the real-time unlocking information is determined to be correct at step S32.

For example, in a case that the preset unlocking information is a fingerprint of the concerned user, when the concerned user uses the smart mobile device of the concerned user to execute the normal unlocking procedure, the lock APP installed on the smart mobile device of the concerned user requests input of a fingerprint as the real-time unlocking information which is compared with the preset unlocking information by the smart mobile device of the concerned user. When the real-time unlocking information does match with the preset unlocking information, the smart mobile device of the concerned user does not output any command to the lock, and the lock remains locked. On the other hand, when the real-time unlocking information matches with the preset unlocking information, the smart mobile device of the concerned user outputs an unlocking command to the lock. The unlocking command may include, but not limited to, a hardware identification serial number associated with the lock. After the lock receives the unlocking command, the lock is unlocked when the hardware identification serial number sent by the smart mobile device of the concerned user is correct. On the other hand, the unlocking command will not be executed when the hardware identification serial number sent by the smart mobile device of the concerned user is incorrect, the lock remains locked.

After the lock is unlocked (switches to the unlocking state), countdown of an unlocking time (a period of time during which the lock remains in the unlocking state) is executed (step S38). When the countdown is over, the lock restores the locking state (step S42). Alternatively, the lock restores the locking state (step S42) after the door is opened (step S40).

Specifically, to prevent the concerned user from forgetting to switch the lock to the locking state after unlocking, after the concerned user unlocks the lock through the normal unlocking procedure, the lock will proceed the countdown procedure (such as 15 seconds). Thus, after the lock has been unlocked for 15 seconds, the lock is automatically locked again and remains in the locking state until the next unlocking operation.

In another case, given the lock is unlocked, when the lock is opened during the unlocking period (for example, the lock is opened at the fifth second), the lock will automatically switch to the locking state and will remain in the locking state until the next unlocking operation. For example, the lock is a door lock mounted on a door, after the door lock is unlocked and is operated to open the door, the door lock will automatically switch to the locking state if the door is closed again, preventing the door from being opened.

The concerned user may also use the lock APP installed on the smart mobile device of the concerned user to execute an emergency report and unlocking procedure (step S44). For example, the interface of the lock APP may present an icon representing the emergency report and unlocking procedure. When execution of the emergency report and unlocking procedure is required, the concerned user may press the icon for 3 seconds, and the lock APP installed on the smart mobile device of the concerned user executes the emergency report and unlocking procedure. It is worth mentioning that the setting of pressing the icon representing the emergency report and unlocking procedure for a long period of time is to avoid touching the icon by mistake. The time of pressing the icon can be adjusted according to needs. For example, the time of pressing the icon can be between 3-10 seconds.

When the concerned user executes the emergency report and unlocking procedure through the interface of the lock APP installed on the smart mobile device of the concerned user, the lock APP requests input of a real-time unlocking information (step S30). The real-time unlocking information is identified at step S32. When the real-time unlocking information is incorrect, the lock remains in the locking state (step S34). When the real-time unlocking information is correct, the lock remains in the unlocking state (step S46).

Specifically, execution of the emergency report and unlocking procedure means that the concerned user extremely needs assistance from other persons and even cannot move near the lock to manually unlock the lock. Therefore, when the lock remains in the unlocking state due to execution of the emergency report and unlocking procedure, the lock will remain in the unlocking state if the lock is not opened.

After the lock in the unlocking state is opened (step S48), the lock restores its locking state (step S50).

For example, the lock is a door lock. When the door is opened while the lock remains in the unlocking state, the concerned user who is not feeling well can be found. Thus, after the door is opened, the door lock automatically switches to the locking state and remains in the locking state until the door lock is unlocked again.

Furthermore, given the real-time unlocking information is correct, while the lock remains in the unlocking state due to execution of the emergency report and unlocking procedure, the lock APP installed on the smart mobile device of the concerned user will automatically execute a reporting procedure in which the smart mobile device of the concerned user reports execution of the emergency report and unlocking procedure to the smart mobile device of the report receiver (step S52). For example, a message associated with execution of the emergency report and unlocking procedure is shown on, e.g., the screen of the smart mobile device of the report receiver by the lock APP installed on the smart mobile device of the report receiver.

After the lock APP installed on the smart mobile device of the concerned user sends the report of execution of the emergency report and unlocking procedure to the smart mobile device of the report receiver, the report is sent again (step S56) when the report receiver does not respond. On the other hand, when the report receiver responds to the report, the report procedure is terminated (step S58).

In a workable embodiment, after the smart mobile device of the report receiver receives the report from the lock APP installed on the smart mobile device of the concerned user, the report receiver can press an icon on the interface of the lock APP installed on the smart mobile device of the report receiver, which activates the smart mobile device of the report receiver to send a command back to the smart mobile device of the concerned user via the network, which, in turn, activates the lock APP installed on the smart mobile device of the concerned user to reach a determination that the report receiver has received the message, and the reporting procedure is terminated.

In another workable embodiment, after the smart mobile device of the report receiver receives the report from the lock APP installed on the smart mobile device of the concerned user, instead of pressing an icon on the interface of the lock APP installed on the smart mobile device of the report receiver, the smart mobile device of the report receiver starts to remind the report receiver of the incoming message through vibration or sound. After the report receiver clicks an icon on the interface of the lock APP installed on the smart mobile device of the report receiver, the vibration or sound is stopped.

Furthermore, in a case that the mobile phone number of the report receiver is required for the reporting procedure, when the concerned user executes the reporting procedure, the smart mobile device of the concerned user directly dials the mobile phone number of the report receiver. After the connection with the smart mobile device of the report receiver is established, the lock APP installed on the smart mobile device of the concerned user determines that it is a response from the report receiver and, thus, terminates the reporting procedure. On the other hand, when the smart mobile device of the report receiver is not connected or does not answer the call, the lock APP installed on the smart mobile device of the concerned user determines that the report receiver does not respond and, thus, repeats reporting (such as repeatedly dial the mobile phone number).

The technical features of the first embodiment of the door access control method capable of sending an emergency report according to the present invention has been set forth in connection with FIG. 1, an example will be set forth to assist in more understanding of the first embodiment of the door access control method capable of sending an emergency report according to the present invention. Assuming a tenant (a concerned user) aged 75 years lives alone in a house owned by a landlord (a report receiver). An electronic door lock (the lock) is installed on a door of the house. The lock APP is installed on the smart mobile device of the landlord, and the landlord has a username but has not yet obtained the management authority of the door lock, such that the smart mobile device of the landlord cannot be used to unlock the door lock. After the tenant moves in the house, the lock APP is installed on the smart mobile device of the tenant, and the management authority of the door lock can be obtained through the procedure disclosed in the first embodiment of the door access control method capable of sending an emergency report according to the present invention. The tenant sets the username of the landlord as the report receiver. Thus, when the tenant wishes to enter the house, the lock APP installed on the smart mobile device of the tenant can be used to execute the normal unlocking procedure to normally unlock the door lock and then open the door. In this case, the landlord will not receive any report or interruption.

In a case that the tenant in the house is not feeling well and cannot walk to the door for opening the door, after the tenant uses the lock APP installed on the smart mobile device of the tenant to execute the emergency report and unlocking procedure, the door lock of the house will remain in the unlocking state permitting any person (a policeman, an ambulance man, the landlord, etc.) to open the door and enter the house. Then, the lock APP installed on the smart mobile device of the tenant sends a message associated with execution of the emergency report and unlocking procedure to the lock APP installed on the landlord via a network. The message will be sent repeatedly until the landlord responds, such that the landlord can be aware of the situation of the tenant and can provide assistance to the tenant, such as go to the house to help the tenant or call an ambulance.

Figure 2:
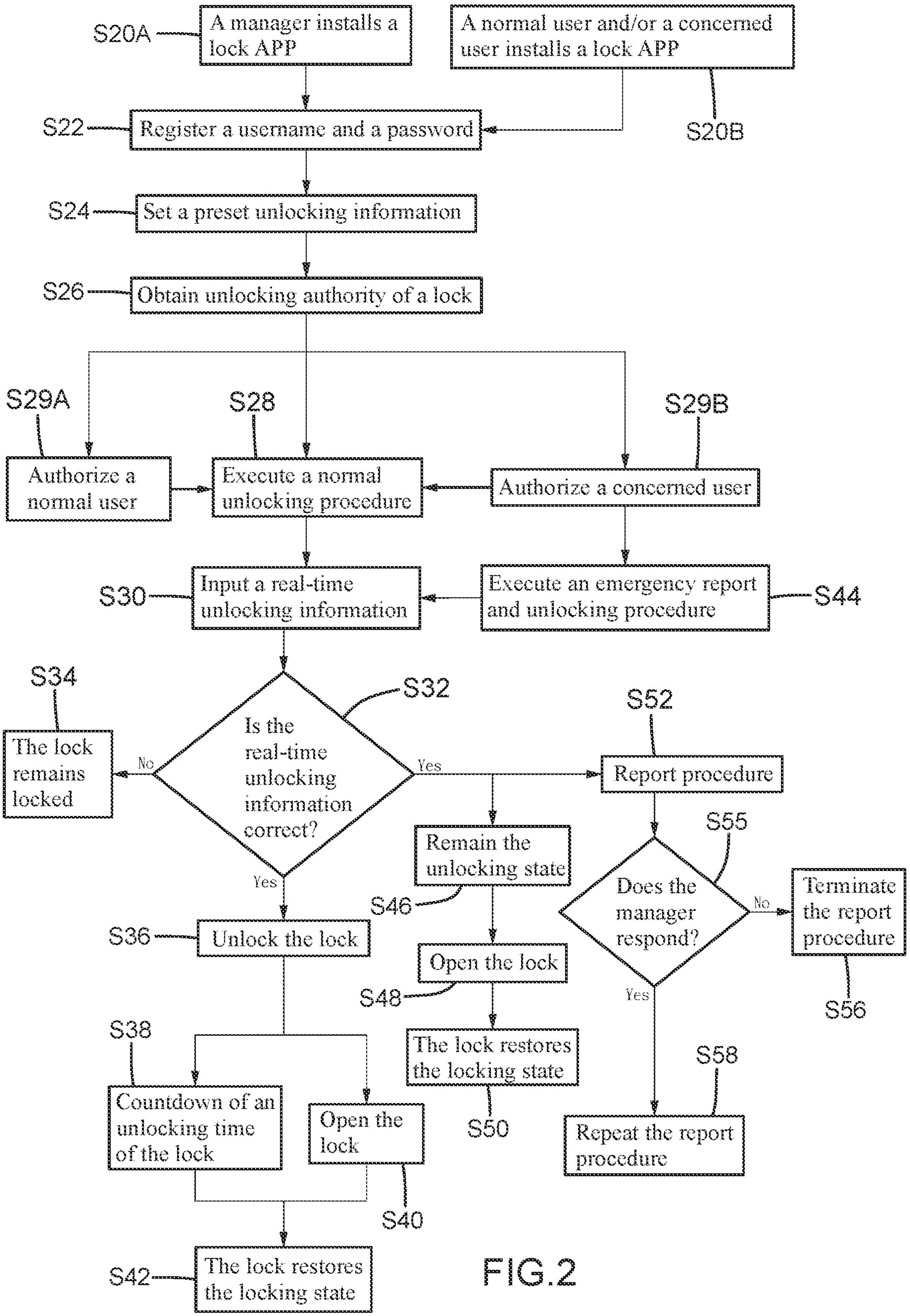
FIG. 2 a schematic flowchart illustrating a door access control method capable of sending an emergency report of a second embodiment according to the present invention.

The first embodiment of the door access control method capable of sending an emergency report according to the present invention shown in FIG. 1 is an embodiment where the manager of the lock is the concerned user. Nevertheless, the door access control method capable of sending an emergency report according to the present invention may be used in other situations. FIG. 2 shows a second embodiment of the door access control method capable of sending an emergency report according to the present invention. The second embodiment is more suitable to a manger who manages at least one normal user and/or at least one concerned user. In this situation, the manager must firstly obtain the management authority of a lock and then authorize the management authority to each normal user and each concerned user.

Specifically, a lock APP is installed on a smart mobile device held by the manager (step S20A). The lock APP can be executed by the manager to obtain the management authority of the lock.

In an embodiment, when the smart mobile device of the manager executes the lock APP for the first time, the interface of the lock APP will guide the manager and/or the report receiver to register a username and a password (step S22). The username may be characters, numbers, symbols, or a combination thereof set by himself or herself. The password may be characters, numbers, symbols, or a combination thereof set by himself or herself. Alternatively, the password may be a biological feature of the holder of the smart mobile device. For example, the password set by the lock APP installed on the smart mobile device of the manager is the biological feature, such as the fingerprint feature, the facial feature, the iris feature, etc., of the manager.

After the manager has registered the username and the password on his or her smart mobile device, the lock APP installed on the smart mobile device of the manager guides the manager to input an unlocking information as a preset unlocking information (step S24). Specifically, the preset unlocking information may be characters, numbers, symbols, or a combination thereof. Alternatively, the unlocking information may be a biological feature, such as the fingerprint feature, the facial feature, the iris feature, etc.

After the smart mobile device of the manager finishes setting of the unlocking information, the lock APP is connected with a lock within the communication range of the smart mobile device of the manager and obtains the management authority of the lock after matching (step S26).

Specifically, the lock may include, but not limited to, two matching buttons, and the lock may be paired with a card which carries a specific serial number. When the lock APP installed on the smart mobile device of the manager is matching with the lock, the interface of the lock APP requests adding of a lock to be managed, and the two matching buttons of the lock are pressed for a longer time (such as 5 seconds), such that the smart mobile device of the manager can search the lock. When the smart mobile device of the manager finds the lock, the lock APP guides the manager to input the serial number on the card. The smart mobile device of the manager can obtain the management authority of the lock only when the inputted serial number is correct. For example, in a case that the smart mobile device of the manager obtains a hardware identification serial number of the lock, in subsequent communication between the smart mobile device of the manager and the lock, the lock may compare the hardware identification serial number sent by the smart mobile device of the manager with its own hardware identification serial number to identify whether the smart phone device connected with the lock has the management authority.

When the lock APP installed on the smart mobile device of the manager executes a normal unlocking procedure (step S28), a real-time unlocking information is inputted into the smart mobile device of the manager under the request of the lock APP installed on the smart mobile device of the manager (step S30). The lock remains in the locking state (step S34) when the real-time unlocking information is determined to be incorrect at step S32. The lock is unlocked (step S36) when the real-time unlocking information is determined to be correct at step S32.

For example, in a case that the preset unlocking information is a fingerprint of the manager, when the manager uses the smart mobile device of the manager to execute the normal unlocking procedure, the lock APP installed on the smart mobile device of the manager requests input of a fingerprint as the real-time unlocking information which is compared with the preset unlocking information by the smart mobile device of the manager. When the real-time unlocking information does not match with the preset unlocking information, the smart mobile device of the manager does not output any command to the lock, and the lock remains locked.

On the other hand, when the real-time unlocking information matches with the preset unlocking information, the smart mobile device of the manager within the wireless communication range of the lock (such as via Bluetooth) outputs an unlocking command to the lock. The unlocking command may include, but not limited to, a hardware identification serial number associated with the lock. After the lock receives the unlocking command, the lock is unlocked when the hardware identification serial number sent by the smart mobile device of the manager is correct. On the other hand, the unlocking command will not be executed when the hardware identification serial number sent by the smart mobile device of the manager is incorrect, the lock remains locked.

After the lock is unlocked, countdown of an unlocking time (a period of time during which the lock remains in an unlocking state) is executed (step S38). When the countdown is over, the lock restores the locking state (step S42). Alternatively, the lock restores the locking state (step S42) after the lock is opened (step S40).

Specifically, to prevent the manager from forgetting to lock after unlocking, after the manager unlocks the lock through the normal unlocking procedure, the lock will proceed the countdown procedure (such as 15 seconds). Thus, after the lock is unlocked for 15 seconds, the lock is automatically locked again and remains in the locking state until the next unlocking operation.

In another case, given the lock is unlocked, when the lock is opened during the unlocking period (for example, the lock is opened at the fifth second), the lock will automatically switch to the locking state and will remain in the locking state until the next unlocking operation. For example, the lock is a door lock mounted on a door, after the door lock is unlocked and is operated to open the door, the door lock will automatically switch to the locking state when the door is closed again, preventing the door from being opened.

Aside from the normal unlocking operation through use of the smart mobile device of the manager, the manager may also use the smart mobile device of the manager to authorize at least one normal user (step S29A) and/or at least one concerned user (step S29B). In a case that the manager intends to authorize a normal user, the lock APP is firstly installed on a smart mobile device of the normal user, and the normal user needs to register a username and a password via an interface of the lock APP installed on the smart mobile device of the normal user (see step S22). The registered username and the password are required when logging in lock APP installed on the smart mobile device of the normal user. Then, a preset unlocking information is set by the normal user under guidance by the lock APP installed on the smart mobile device of the normal user (see step S24). For example, the normal user uses the lock APP installed on the smart mobile device of the normal user to input his or her fingerprint (which is different from the unlocking information inputted by the manager) as the preset unlocking information.

After the manger obtains the username of the normal user, the manager uses the interface of the lock APP installed on the smart mobile device of the manager to input the username of the normal user to be authorized, and then selects a to-be-authorized lock whose authority is to be authorized to the normal user. It is noted that a manger may have the manage authority of a plurality of locks. The lock APP installed on the smart mobile device of the manager sends an authorizing packet (which may be encrypted) through a network to the lock APP installed on the smart mobile device of the normal user. The authorizing packet may include, but not limited to, the hardware identification information of the lock and the type of authorization (a normal user or a concerned user). Thus, the lock APP installed on the smart mobile device of the normal user obtains the authority to execute the normal unlocking procedure of the lock with the specific hardware identification serial number (which is decided by the type of authority).

When the lock APP installed on the smart mobile device of the normal user executes a normal unlocking procedure (step S28), the lock APP installed on the smart mobile device of the normal user requests input of a real-time unlocking information (step S30). The lock remains in the locking state (step S34) when the real-time unlocking information is determined to be incorrect at step S32. The lock is unlocked (step S36) when the real-time unlocking information is determined to be correct at step S32. Similar to the normal unlocking procedure executed by the manager, after the lock is unlocked, countdown of the unlocking time (a period of time during which the lock remains in an unlocking state) is executed (step S38). In a case that the lock is not opened during the countdown period (such as 15 seconds), the lock automatically restores the locking state (step S42). Alternatively, when the lock is opened during the countdown period, the lock also automatically restores the locking state (step S42). It is noted that since the normal user does not obtain the authority of a concerned user, the normal user cannot execute the emergency report and unlocking procedure.

In another case that the manager intends to authorize a concerned user, the lock APP is firstly installed on a smart mobile device of the concerned user (step S20B), and the concerned user needs to register a username and a password via an interface of the lock APP installed on the smart mobile device of the concerned user (see step S22). The registered username and the password are required when logging in lock APP installed on the smart mobile device of the concerned user. Then, a preset unlocking information is set by the concerned user under guidance by the lock APP installed on the smart mobile device of the concerned user (see step S24). For example, the concerned user uses the lock APP installed on the smart mobile device of the concerned user to input his or her fingerprint (which is different from the unlocking information inputted by the manager) as the preset unlocking information.

After the manger obtains the username of the concerned user, the manager uses the interface of the lock APP installed on the smart mobile device of the manager to input the username of the concerned user to be authorized, and then selects a to-be-authorized lock whose authority is to be authorized to the concerned user. It is noted that a manger may have the manage authority of a plurality of locks. The lock APP installed on the smart mobile device of the manager sends an authorizing packet (which may be encrypted) through a network to the lock APP installed on the smart mobile device of the concerned user. The authorizing packet may include, but not limited to, the hardware identification information the lock and the type of authorization (a normal user or a concerned user). Thus, the lock APP installed on the smart mobile device of the concerned user obtains the authority to execute the normal unlocking procedure of the lock (with the specific hardware identification serial number) and the emergency report and unlocking procedure, which is decided by the type of authority.

When the lock APP installed on the smart mobile device of the concerned user executes a normal unlocking procedure (step S28), the lock APP installed on the smart mobile device of the concerned user requests input of a real-time unlocking information (step S30). The lock remains in the locking state (step S34) when the real-time unlocking information is determined to be incorrect at step S32. The lock is unlocked (step S36) when the real-time unlocking information is determined to be correct at step S32. Similar to the normal unlocking procedure executed by the manager, after the lock is unlocked, countdown of the unlocking time (a period of time during which the lock remains in the unlocking state) is executed (step S38). In a case that the lock is not opened during the countdown period (such as 15 seconds), the lock automatically restores the locking state (step S42). Alternatively, when the lock is opened during the countdown period, the lock also automatically restores the locking state (step S42).

The concerned user may also use the lock APP installed on the smart mobile device of the concerned user to execute an emergency report and unlocking procedure (step S44). For example, the interface of the lock APP may present an icon representing the emergency report and unlocking procedure. When execution of the emergency report and unlocking procedure is required, the concerned user may press the icon for 3 seconds, and the lock APP installed on the smart mobile device of the concerned user executes the emergency report and unlocking procedure. It is worth mentioning that the setting of pressing the icon representing the emergency report and unlocking procedure for a long period of time is to avoid touching the icon by mistake. The time of pressing the icon can be adjusted according to needs. For example, the time of pressing the icon can be between 3-10 seconds.

When the concerned user executes the emergency report and unlocking procedure through the interface of the lock APP installed on the smart mobile device of the concerned user, the lock APP requests input of a real-time unlocking information (step S30). The real-time unlocking information is identified at step S32. When the real-time unlocking information is incorrect, the lock remains in the locking state (step S34). When the real-time unlocking information is correct, the lock remains in the unlocking state (step S46).

Specifically, execution of the emergency report and unlocking procedure means that the concerned user extremely needs assistance from other persons and even cannot move near the lock to manually unlock the lock. Therefore, when the lock remains in the unlocking state under execution of the emergency report and unlocking procedure, the lock will remain in the unlocking state if the lock is not opened.

When the lock is opened while the lock is in the unlocking state (step S48), the lock restores its locking state (step S50).

For example, the lock is a door lock. When the door is opened while the lock remains in the unlocking state, the concerned user who is not feeling well can be found. Thus, after the door is opened, the door lock automatically switches to the locking state and remains in the locking state until the door lock is unlocked again.

Furthermore, while the lock remains in the unlocking state due to execution of the emergency report and unlocking procedure, the lock APP installed on the smart mobile device of the concerned user will automatically execute a reporting procedure in which the smart mobile device of the concerned user reports execution of the emergency report and unlocking procedure to the smart mobile device of the report receiver (step S52). For example, a message associated with execution of the emergency report and unlocking procedure is shown on, e.g., the screen of the smart mobile device of the report receiver by the lock APP installed on the smart mobile device of the report receiver.

After the lock APP installed on the smart mobile device of the concerned user sends the report of execution of the emergency report and unlocking procedure to the smart mobile device of the report receiver, the report is sent again (step S56) when the report receiver does not respond. On the other hand, when the report receiver responds to the report, the report procedure is terminated (step S58).

In a workable embodiment, after the smart mobile device of the report receiver receives the report from the lock APP installed on the smart mobile device of the concerned user, the report receiver can press an icon on the interface of the lock APP installed on the smart mobile device of the report receiver, which activates the smart mobile device of the report receiver to send a command back to the smart mobile device of the concerned user via the network, which, in turn, activates the lock APP installed on the smart mobile device of the concerned user to reach a determination that the report receiver has received the message, and the reporting procedure is terminated.

In another workable embodiment, after the smart mobile device of the report receiver receives the report from the lock APP installed on the smart mobile device of the concerned user, instead of pressing an icon on the interface of the lock APP installed on the smart mobile device of the report receiver, the smart mobile device of the report receiver starts to remind the report receiver of the incoming message through vibration or sound. After the report receiver clicks an icon on the interface of the lock APP installed on the smart mobile device of the report receiver, the vibration or sound is stopped.

The technical features of the second embodiment of the door access control method capable of sending an emergency report according to the present invention has been set forth in connection with FIG. 2, an example will be set forth to assist in more understanding of the second embodiment of the door access control method capable of sending an emergency report according to the present invention. Assuming a manager of a health preservation village owns management authority of door locks of a plurality of rooms. Furthermore, the manager authorizes the authority of execution of the emergency report and unlocking procedure and the normal unlocking procedure to residents of some rooms and authorizes the authority of execution of normal unlocking procedure to workers of other rooms, such that each worker can execute the normal unlocking procedure to unlock a locked room whose authority has been granted to the worker. The resident of each room can enter his or her own room through execution of the normal unlocking procedure to unlock the door lock of his or her own room. In a case that a resident in a room is not feeling well and is unable to walk to the door for unlocking the door lock, the sick resident can use the lock APP installed on his or her smart mobile phone to execute the emergency report and unlocking procedure. When the real-time unlocking information inputted by the sick resident is correct, the door lock of the room remains in the unlocking state, and the lock APP installed on the smart mobile device of the manager displays execution of the emergency report and unlocking procedure by the resident of the associated room. Thus, the manager can know who executes the emergency report and unlocking procedure at the first moment and take necessary actions accordingly.

In each embodiment of the present invention, when a concerned user needs help, the emergency report and unlocking procedure can be executed to keep the lock at the location of the concerned user in the unlocking state, and the lock will not restore the locking state unless the lock is opened. Thus, any person can open the lock to check the situation of the concerned user.

In each embodiment, when the concerned user executes the emergency report and unlocking procedure, the lock (such as a door lock) can remain in the unlocking state without movement of the concerned user who is not feeling well or is unable to move smoothly, providing excellent convenience.

In each embodiment, when the concerned user executes the emergency report and unlocking procedure, the manager or a preset report receiver will receive the report. Thus, the situation of the concerned user requiring help can be reported at the first moment.

In the second embodiment, the manager can selectively authorize a normal user and/or a concerned user, such that the normal user can only execute the normal unlocking procedure, whereas the concerned user can execute the normal unlocking procedure and the emergency report and unlocking procedure. Thus, it is more convenient for the manager to manage a plurality of locks and associated persons.

The concerned user is permitted to unlock the lock through the normal unlocking procedure, such that the concerned user can normally access the house or the room without interrupting the manager or the report receiver.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A door access control method capable of sending an emergency report, with the door access control method comprising:

installing a lock application (lock APP) on a first smart mobile device of a manager;

installing the lock APP on a second smart mobile device of a concerned user in a house or a room, with the concerned user using the second smart mobile device to set a first preset unlocking information;

using the lock APP installed on the first smart mobile device to match with a lock within a communication range of the first smart mobile device to thereby obtain management authority of the lock, wherein the lock is configured to be mounted on a door of the house or the room;

using the first smart mobile device to authorize authority of execution of an emergency report and unlocking procedure on the lock to the second smart mobile device;

wherein when the concerned user executes the emergency report and unlocking procedure via an interface of the lock APP installed on the second smart mobile device, the lock APP installed on the second smart mobile device is used to input a real-time unlocking information, wherein when the real-time unlocking information does not match with the first preset unlocking information, the lock remains in a locking state, wherein when the real-time unlocking information matches with the first preset unlocking information, the second smart mobile device executes a reporting procedure to send the emergency report to the manager, the lock is switched to an unlocking state and remains in the unlocking state unless the door is opened, wherein the emergency report indicates that the concerned user needs assistance, and wherein the lock restores the locking state after the door is opened.

2. The door access control method capable of sending the emergency report as claimed in claim 1, wherein the interface of the lock APP installed on the first smart mobile device guides setting of a second preset unlocking information, wherein when the manager uses the interface of the lock APP installed on the first smart mobile device to execute a normal unlocking procedure without executing the emergency report and unlocking procedure, a second real-time unlocking information is inputted into the first smart mobile device, wherein the lock remains in the locking state when the second real-time unlocking information inputted into the first smart mobile device does not match with the second preset unlocking information, wherein the lock switches to the unlocking state when the second real-time unlocking information inputted into the first smart mobile device matches with the second preset unlocking information, wherein a countdown of an unlocking time of the lock is executed after the lock switches to the unlocking state, and wherein the lock switches back to the locking state after the countdown is over or the door is opened, and wherein the manager is prevented from executing the emergency report and unlocking procedure through the first smart mobile device.

3. The door access control method capable of sending the emergency report as claimed in claim 1, further comprising:

installing the lock APP on a third smart mobile device of a normal user, registering a username of the normal user, and setting a third preset unlocking information; and using the first smart mobile device and the username of the normal user to authorize the authority of execution of a normal unlocking procedure of the lock to the third smart mobile device without executing the emergency report and unlocking procedure, wherein when the normal user uses an interface of the lock APP installed on the third smart mobile device to execute the normal unlocking procedure, the third smart mobile device is used to input a second real-time unlocking information, wherein the lock remains in the locking state when the second real-time unlocking information inputted into the third smart mobile device does not match with the third preset unlocking information, wherein the lock switches to the unlocking state when the second real-time unlocking information inputted into the third smart mobile device matches with the third preset unlocking information, wherein a countdown of an unlocking time of the lock is executed after the lock switches to the unlocking state, and wherein the lock switches back to the locking state after the countdown is over or the door is opened, and wherein the normal user is prevented from executing the emergency report and unlocking procedure through the third smart mobile device.

4. The door access control method capable of sending the emergency report as claimed in claim 1, wherein the interface of the lock APP presents an icon representing the emergency report and unlocking procedure, wherein when execution of the emergency report and unlocking procedure is required, the concerned user presses the icon for a predetermined period of time not shorter than 3 seconds, and the lock APP installed on the smart mobile device of the concerned user executes the emergency report and unlocking procedure.

5. The door access control method capable of sending the emergency report as claimed in claim 1, wherein the emergency report and unlocking procedure is executed when the icon is pressed for 3-10 seconds.

6. The door access control method capable of sending the emergency report as claimed in claim 1, wherein the concerned user uses the second smart mobile device to register a username, wherein the manager uses the username to authorize the authority of execution of the emergency report and unlocking procedure to the second smart mobile device, wherein when the concerned user uses the interface of the lock APP installed on the second smart mobile device to execute a normal unlocking procedure without executing the emergency report and unlocking procedure, a second real-time unlocking information is inputted into the second smart mobile device, wherein the lock remains in the locking state when the second real-time unlocking information does not match with the first preset unlocking information, wherein the lock switches to the unlocking state when the second real-time unlocking information matches with the first preset unlocking information, wherein a countdown of an unlocking time of the lock is executed after the lock switches to the unlocking state, and wherein the lock switches back to the locking state after the countdown is over or the door is opened.

7. The door access control method capable of sending the emergency report as claimed in claim 6, wherein the interface of the lock APP installed on the first smart mobile device guides setting of a second preset unlocking information, wherein when the manager uses the interface of the lock APP installed on the first smart mobile device to execute the normal unlocking procedure, a third real-time unlocking information is inputted into the second first smart mobile device, wherein the lock remains in the locking state when the third real-time unlocking information inputted into the first smart mobile device does not match with the second preset unlocking information, wherein the lock switches to the unlocking state when the third real-time unlocking information inputted into the first smart mobile device matches with the second preset unlocking information, wherein the countdown of the unlocking time of the lock is executed after the lock switches to the unlocking state, and wherein the lock switches back to the locking state after the countdown is over or the door is opened, and wherein the manager is prevented from executing the emergency report and unlocking procedure through the first smart mobile device.

8. The door access control method capable of sending the emergency report as claimed in claim 1, wherein the emergency report sent to the manager indicates that the concerned user is unable to open the door, wherein when the manager does not respond to the emergency report, the emergency report is repeatedly sent to the manager, and wherein the reporting procedure is terminated when the manager responds to the emergency report.

9. The door access control method capable of sending the emergency report as claimed in claim 5, wherein when the lock APP installed on the second smart mobile device executes the reporting procedure, the interface of the lock APP installed on the first smart mobile device shows a message associated with the emergency report, and wherein the manager uses the interface of the lock APP installed on the first smart mobile device to respond to the emergency report and to terminate the reporting procedure.

* * * * *